United States Patent [19]

Nishimura

[11] Patent Number: 5,076,554

[45] Date of Patent: Dec. 31, 1991

[54] ARTICLE FIXING DEVICE

[75] Inventor: Akira Nishimura, Kanazawa, Japan

[73] Assignee: Kabushiki Kaisha Nishimura Jig, Kanazawa, Japan

[21] Appl. No.: 582,378

[22] Filed: Sep. 13, 1990

[30] Foreign Application Priority Data

Feb. 21, 1990 [JP] Japan .................................... 2-40425

[51] Int. Cl.[5] ............................................... B23Q 1/04

[52] U.S. Cl. .................................................... 269/282

[58] Field of Search .......................... 269/97, 134-137, 269/279-284, 237-239, 155, 246

[56] References Cited

U.S. PATENT DOCUMENTS

| | | | |
|---|---|---|---|
| 2,587,025 | 2/1952 | Beck et al. | 269/134 |
| 3,017,174 | 1/1962 | Reuter | 269/97 |
| 3,020,041 | 2/1962 | Peterson et al. | 269/135 |
| 3,915,443 | 10/1975 | Lambert | 269/279 |
| 4,750,722 | 6/1988 | Chick | 269/282 |
| 4,953,840 | 9/1990 | Nishimura | 269/282 |

*Primary Examiner*—Robert C. Watson
*Attorney, Agent, or Firm*—Oblon, Spivak, McClelland, Maier & Neustadt

[57] ABSTRACT

The present invention relates to an article fixing device for fixing an article to be mounted to a mounting surface of a mounting member removably. Both sides of the mounting member are grippingly fixed by a pair of pivoting members mounted to the article to be mounted. The article to be mounted can be mounted in close contact with the mounting surface of the mounting member by rotating forces of the pivoting members.

3 Claims, 2 Drawing Sheets

ARTICLE FIXING DEVICE

BACKGROUND ART

The present invention relates to an article fixing device for fixing an article to be mounted in close contact with a mounting surface of a mounting member, and more particularly to a fixing device using a vice as a mounting member and a vice attachment as an article to be mounted.

Generally, in fixing an article to be mounted to a mounting member removably, a flange formed integrally with the mounting member is utilized in many cases. In machining, for example, a flange formed integrally with a vice is used in most cases for fixing a vice attachment to the vice.

More particularly, in the case of mounting a vice attachment between a fixed jaw and a movable jaw of a vice, the upper surface of a base on which the movable jaw slides can be utilized as a mounting surface, while undercut portions formed along both sides of the base can be utilized as flanges. Below both right and left ends of the vice attachment there are disposed two block pieces in abutment with the lower surfaces of the flanges, then connecting bolts suspended from the vice attachment are brought into threaded engagement with the block pieces, and the block pieces are clamped up through the connecting bolts, thereby clamping and fixing the vice attachment to the mounting surface.

Such fixing means are commonly utilized not only for the vice attachment but also in other fields because it can fix an article to be mounted firmly in close contact with a mounting member.

According to the above prior art, however, an article to be mounted such as a vice attachment is fixed in close contact with a mounting surface of a mounting member by sandwiching flanges in between fixing block pieces and the mounting surface, so in the case of a mounting member such as a vice not formed with flanges, it is impossible to fix an article to be mounted in close contact with the mounting member. In the case of a vice attachment, therefore, the vice attachment cannot be fixed in close contact with a mounting surface of the vice and so is unstable, thus giving rise to a serious problem that the work positioning accuracy is deteriorated markedly.

OBJECT OF THE INVENTION

The present invention has been accomplished in view of the above-mentioned problem and it is the object thereof to provide an article fixing device capable of fixing an article to be mounted in close contact with a mounting surface of even a mounting member not provided with a flange, without causing any fear of deterioration in the positioning accuracy, etc. Particularly, when applied to a vice attachment to be mounted to a vice, this fixing device can effect positioning of a work, etc. with high accuracy.

DISCLOSURE OF THE INVENTION

According to the construction of the present invention, tip ends of a pair of pivoting members come into abutment with side faces of a mounting member on both sides of the mounting member, and at least one such pivoting member is pressed toward the side face(s) by means of a pressing member, so an article to be mounted can be fixed to the mounting member in a sandwiched state of the mounting member. At this time, the abutting tip ends of the pivoting members are disposed on the mounting surface side with respect to a working line of the pressing member, and the pivoting member each undergo a rotating force in a direction moving away from the mounting surface around the tip end thereof. By this rotating force, the article to be mounted can be fixed in close contact with the mounting surface through connecting members.

When the pressing member is movable forward and backward, it is possible to change the spacing between the tip ends of the pivoting members, so it is possible to deal with even mounting members having mounting surfaces of different widths.

Further, when the pressing member is mounted through a lever member, the moving stroke of the pressing member can be enlarged by the lever member and therefore the operation for mounting and removing an article can be done in an extremely simple manner.

In the case where the above fixing device is applied to a vice and a vice attachment, even when the vice does not have a flange, the vice attachment can be fixed in close contact with a mounting surface of the vice by holding the side faces of the vice grippingly.

BRIEF DESCRIPTION OF THE DRAWINGS

FIGS. 1 to 3 illustrate an embodiment of the present invention, of which:

FIG. 1 is an exploded, perspective, explanatory view of the whole of an article fixing device embodying the invention;

FIG. 2 is a longitudinal, sectional, explanatory view thereof; and

FIG. 3 is a view as seen at III in the arrowed direction.

| | | | |
|---|---|---|---|
| V | vice | $V_3$ | side view |
| $V_4$ | mounting surface | La | working line |
| 11 | connecting member | 12 | pivoting member |
| 13 | pressing member | 14 | lever member |
| 20 | vice attachment | 21 | body |

DETAILED DESCRIPTION OF THE INVENTION

Embodiments of the present invention will be described hereinunder with reference to the accompanying drawings.

Figure 1:
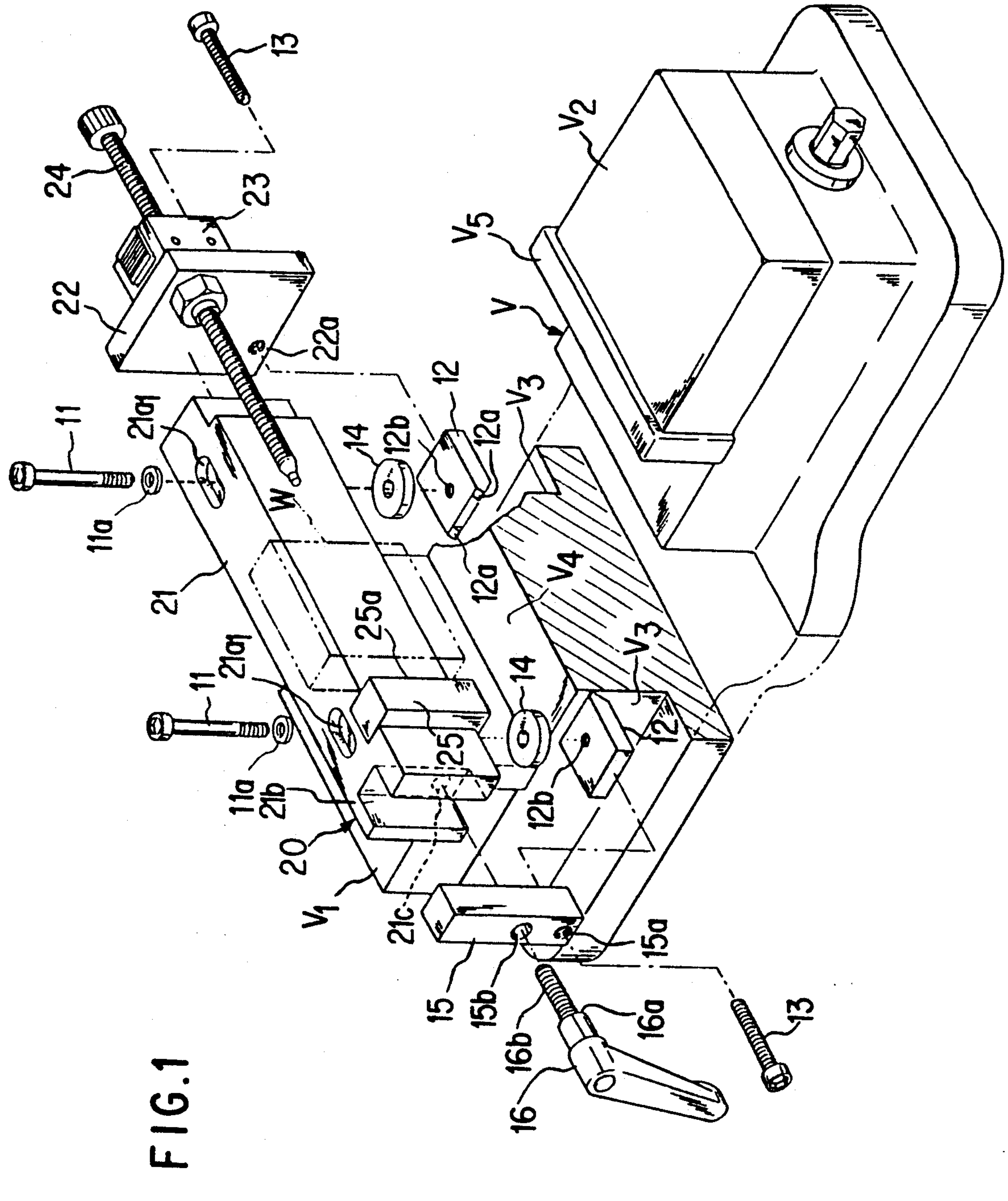
Figure 2:
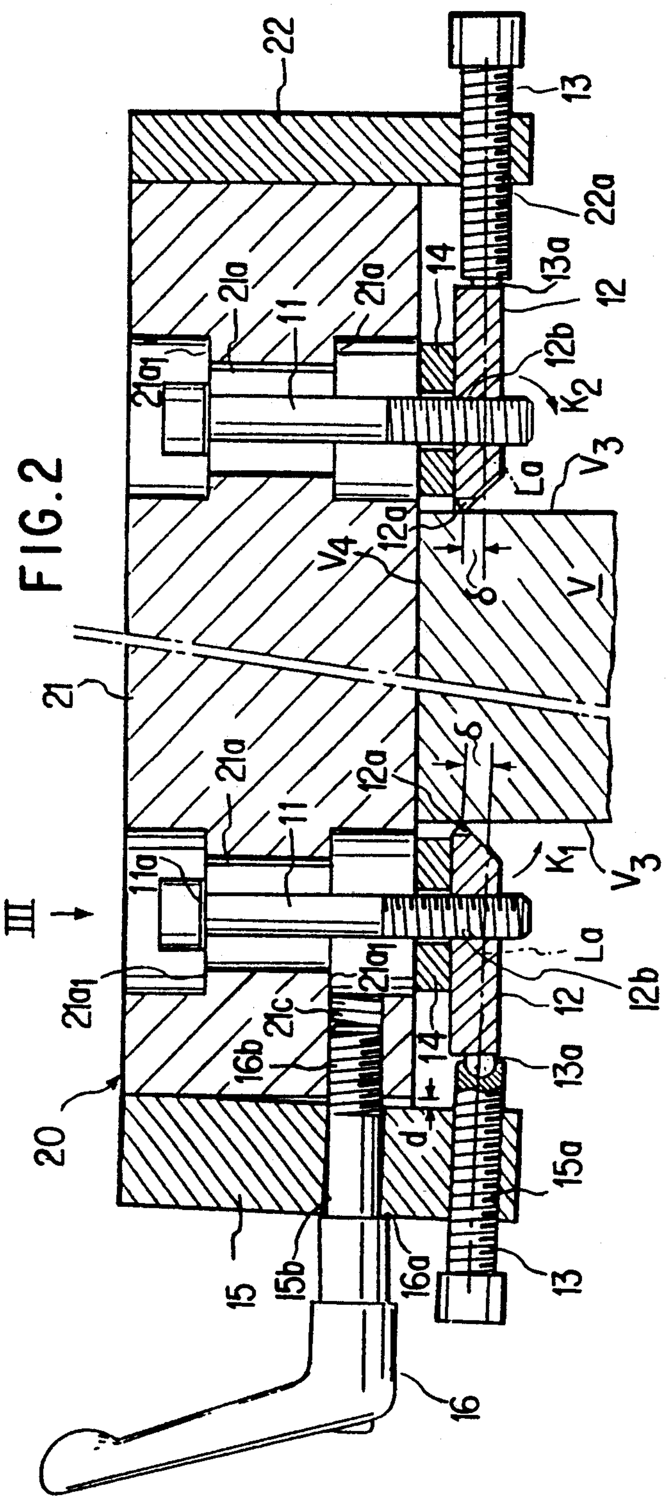

As shown in FIGS. 1 and 2, a vice attachment 20 is provided with a mounting mechanism comprising connecting members 11, 11, and pressing members 13, 13 for pressing the pivoting members 12, 12 toward the center.

The vice attachment 20 is mounted to the front face of fixed jaw $V_1$ of a vice V and is used for holding a work W in a predetermined posture between it and a movable jaw $V_2$. A body 21 of the vice attachment 20 is formed in the shape of a square pole which is a little longer than the front face of the fixed jaw $V_1$. To one end of the body 21 is fixed a base 22, and a clamping bolt 24 is threadedly engaged with the base 22 through a holder 23, while the other end of the body 21 is provided with a clamping block 25 having a vertical surface 25*a* formed in opposed relation to the tip end of the clamping bolt 24. Thus, a work W is positioned with reference to one side thereof, then the movable jaw $V_2$ is advanced to clamp the work W between a mouthpiece $V_5$ and the body 21, whereby the side faces of the work W can be fixed vertically. If thereafter the upper surface of the work W is cut, there can be obtained a cut surface which is perpendicular to the side faces of the work.

Figure 3:
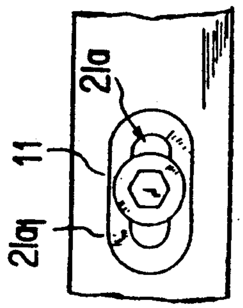

The connecting members 11, 11, which may be bolts with hexagonal holes, are connected to the pivoting members 12, 12 threadedly through the body 21. Through the surface and the back of the body 21 there are formed elongated holes *21a, 21a* having stepped portions ***21a*₁, *21a*₁, . . . (see FIG. 3). The connecting members 11, 11 extend through the elongated holes *21a, 21a*, and the tip ends thereof come into threaded engagement with internal threads *12b, 12b* of the pivoting members 12, 12. The pivoting members 12, 12 are disposed so as to abut side faces $V_3$, $V_3$ of the vice V. The head of each connecting member 11 is engaged with the surface-side stepped portion $21a_1$ through a washer *11a***.

The pivoting members 12, 12 are disposed opposedly to each other on both sides of the vice V and the respective tip ends are in abutment with the side faces $V_3$, $V_3$ of the vice V. Each pivoting member 12 is formed in the shape of a plate and the tip end thereof is provided with sharp wedge-like projections *12a, 12a*. The projections *12a, 12a* are formed so that the tip ends thereof are located in higher positions (on the mounting surface side) than the center in the thickness direction of the pivoting member. The projections *12a, 12a* are formed on only one end side of each pivoting member 12.

Between the pivoting members 12, 12 and the body 21 there are interposed ring-like spacers 14, 14 having elasticity.

The pressing members 13, 13 comprise bolts and generally semispherical pressing pieces *13a, 13a* fitted in the tip ends of the bolts. The pressing members 13, 13 press the pivoting members 12, 12 threadedly toward the side faces $V_3$, $V_3$ of the vice V. The pressing piece *13a* is mounted rotatably with respect to the pressing member 13 and is always in planar abutment with the rear end face of the pivoting member 12. One pressing member 13 (shown on the right side in FIG. 2) is threadedly engaged substantially horizontally with internal threads *22a* formed in the base 22 which is fixed to the body 21, while the other pressing member 13 (shown on the left side in FIG. 2) is threadedly engaged substantially horizontally with internal threads *15a* formed in a lower part of the lever member 15. The pressing members 13, 13 can be adjusted forward and backward by being rotated forward and reverse.

The lever member 15 is fitted in a square slot *21b* formed in one end of the body 21 and is supported pivotably with its upper edge as a fulcrum through a lever 16. The lever 16 extends through a through hole *15b* formed in an intermediate part of the lever member 15, and internal threads *16b* formed in the tip end of the lever 16 are threadedly engaged with internal threads *21c* formed in the body 21. Further, the lever 16 is formed with a stepped portion *16a*, and upon rotation of the lever 16 the pressing member 13 can impart a pressing force to the pivoting member 12 through the lever member 15. A working line La of this pressing force is disposed below the tip end of the pivoting member 12 by a distance $\delta$, thus creating a force which pivots downward with the tip end of the pivoting member 12 as a fulcrum, which force acts to press the lower surface of the body 21 against a mounting surface $V_4$ of the vice V. This relation is just the same also with respect to the pressing member 13 and pivoting member 12 disposed on the other side.

In fixing the vice attachment 20 onto the mounting surface $V_4$ of the vice V, the body 21 of the vice attachment 20 is placed on the front face of the fixed jaw $V_1$, then the pressing members 13, 13 are adjusted forward and backward so that the tip ends of the pivoting members 12, 12 lightly abut the side faces $V_3$, $V_3$ of the vice V. At this time, a slight gap d should remain between the lower portion of the lever member 15 and the body 21, and the connecting members 11, 11 should be adjusted to the extent that the pivoting members 12, 12 are in light contact with the lower surface of the body 21 through spacers 14, 14.

Subsequently, when the pressing member 13 is advanced through the lever member 15 by turning the lever 16, since the pressing member 13 can press the pivoting member 12 substantially horizontally toward the side face $V_3$, the right and left pivoting members 12, 12 are clamped in the horizontal direction so that their tip ends hold the vice V therebetween.

At this time, a vertically downward pressing force is exerted on the vice attachment 20 by the pivoting members 12, 12 whereby the attachment 20 can be brought into close contact firmly with the mounting surface $V_4$. More particularly, the tip end of the pivoting member 12 on the lever member 15 side abuts the side face $V_3$ on an upper side with respect to the working line La, so undergoes the pressing force from the pressing member 13, resulting in that a rotating force in the direction of arrow $K_1$ in FIG. 2 acts on the pivoting member 12 with the tip end of the pivoting member as the center, whereby the vice attachment 20 can be brought into close contact firmly with the mounting surface $V_4$ through the connecting member 11.

Thus, at the same time when the tip ends of the pivoting members 12, 12 clamp the vice V in the horizontal direction under the pressing force of the pressing member 13, the vice attachment 20 is brought into close contact with the mounting surface $V_4$ and can be firmly fixed thereto.

In removing the vice attachment 20 from the vice V, by operating the lever 16 in a loosening direction to remove the pressing force against the pivoting members 12, 12, both the horizontal and vertical clamps can be released at a time. Thereafter, by lifting the whole of the vice attachment 20 upwards, it can be removed easily from the vice V.

In adjusting the connecting members 11, 11, the spacers 14, 14 not only sets height positions of the pivoting members 12, 12 appropriately relative to the pressing members 13, 13, but also prevent the postures of the pivoting members 12, 12 from being deviated to the extreme degree from the horizontal direction. Further, since the spacers 14, 14 have suitable elasticity, a pressing force is exerted on the pivoting members 12, 12 by the pressing members 13, 13, and there is no fear of unnecessary force being exerted on the pivoting members 12, 12 even when the pivoting members rotate in the directions of $K_1$ and $K_2$ in FIG. 2. Therefore, it is not likely at all for the tip ends of pivoting members 12, 12 to slip on the side faces $V_3$, $V_3$.

Another Embodiment

Figure 4:
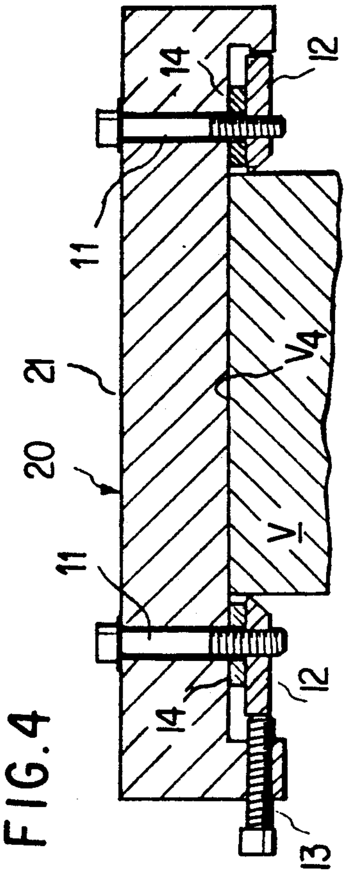
FIG. 4 is a longitudinal, sectional, explanatory view showing another embodiment of the present invention.

As shown in FIG. 4, one of the paired pressing members 13, 13 in the vice attachment 20 may be omitted. In this embodiment, the lever member 15 and the lever 16 are also omitted, and the vice attachment 20 is mounted and removed by rotating the pressing member 13 directly. But it goes without saying that the pressing member 13 may be mounted through the lever member 15 and operated through the lever 16.

In the above description, the vice attachment 20 and the vice V may be replaced with any other article to be mounted and mounting member, respectively. Thus, the present invention is widely applicable as an article fixing device in various uses. For example, if the article to be mounted is a cover member and the mounting member is a case member having a mounting surface for the cover member, the former can be fixed in close contact with the latter removably. In this case, two pairs or more, mutually opposed, pressing members may be provided for one cover member.

As set forth hereinabove, by using the pivoting members, an article to be mounted can be brought into close contact with a mounting surface of a mounting member through the connecting members, so an article to be mounted can be mounted even to a mounting member not provided with a flange firmly and that in a simple manner. Also, it can be removed easily. Further, when the fixing device of the invention is applied to a vice not provided with a flange and a vice attachment, the vice attachment can be fixed firmly in close contact with a mounting surface of the vice, so there is no fear of deterioration in the work mounting accuracy; besides, the mounting and removal of a work are extremely easy.

What is claimed is:

1. An article fixing device for fixing an article to be mounted in close contact with a mounting surface of a mounting member, comprising:

a pair of pivoting members which are brought into abutment with both side faces of said mounting surface, said pivoting members being mounted to said article to be mounted through connecting members; and pressing members for pressing said pivoting members to said side faces, said pressing members being mounted to said article to be mounted, said pivoting members having sharp tip ends and the portions of said sharp tip ends in abutment with said side faces being positioned on the mounting surface side of said mounting member with respect to a working line of force of said pressing members against said pivoting members;

wherein said pressing members are bolts and are threadedly engaged with said article to be mounted so as to be movable forward and backward, a lever member is mounted to said article to be mounted through a lever capable of moving forward and backward, and one said pressing member is mounted to said lever member, and said mounting member is a vice; said article to be mounted is a vice attachment; and said pivoting members are disposed on both sides below a body of said vice attachment.

2. An article fixing device according to claim 1, wherein said connecting members are bolts and are threadedly engaged with said pivoting members through elongated holes formed in said article to be mounted.

3. An article fixing device according to claim 1, wherein a clamping block is disposed at one end of said body of the vice attachment, and a clamping bolt capable of moving forward and backward in opposed relation to said clamping block is provided in said body.

* * * * *